(12) United States Patent
Du et al.

(10) Patent No.: US 11,689,638 B2
(45) Date of Patent: Jun. 27, 2023

(54) EMBEDDED DATABASE AS A MICROSERVICE FOR DISTRIBUTED CONTAINER CLOUD PLATFORM

(71) Applicant: SAP SE, Walldorf (DE)

(72) Inventors: Long Du, Xi'an (CN); Le Zhang, Xi'an (CN); Yu Wang, Xi'an (CN)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 16/870,427

(22) Filed: May 8, 2020

(65) Prior Publication Data

US 2020/0274946 A1 Aug. 27, 2020

Related U.S. Application Data

(63) Continuation of application No. 15/355,129, filed on Nov. 18, 2016, now Pat. No. 10,686,908.

(51) Int. Cl.
*H04L 67/60* (2022.01)
*H04L 67/06* (2022.01)
*H04L 67/1001* (2022.01)

(52) U.S. Cl.
CPC .............. *H04L 67/60* (2022.05); *H04L 67/06* (2013.01); *H04L 67/1001* (2022.05)

(58) Field of Classification Search
CPC ..... H04L 67/32; H04L 67/06; H04L 67/1002; H04L 67/1001; H04L 67/60
See application file for complete search history.

(56) References Cited

U.S. PATENT DOCUMENTS

| | | | | |
|---|---|---|---|---|
| 5,937,414 | A | * | 8/1999 | Souder .................... G06F 16/20 707/616 |
| 8,301,686 | B1 | * | 10/2012 | Appajodu ............. G06F 9/5077 709/201 |
| 9,465,645 | B1 | | 10/2016 | Roth et al. |
| 10,021,120 | B1 | * | 7/2018 | Salour ................. G06F 11/2097 |
| 2006/0230128 | A1 | | 10/2006 | Chung et al. |
| 2009/0070792 | A1 | | 3/2009 | Cable |
| 2009/0276774 | A1 | | 11/2009 | Kinoshita |

(Continued)

OTHER PUBLICATIONS

Non-Final Office Action dated Sep. 19, 2018, issued for U.S. Appl. No. 15/355,079, filed Nov. 18, 2016, 21 pages.

(Continued)

*Primary Examiner* — Nam T Tran
(74) *Attorney, Agent, or Firm* — Klarquist Sparkman, LLP

(57) ABSTRACT

Disclosed is a framework for providing microservices for database with embedded container service in a container cloud platform. The framework includes a container cloud manager for performing distributed management of resources in a data center. The container cloud manager includes an orchestrator with a flexible job scheduler and operator pool. The flexible job scheduler and container cloud master form a flexible job management platform for managing jobs of the data center. The flexible job management framework can isolate various types of jobs as well as mix various jobs for efficient usage of hosts or resources in the data center. The operator pool includes optional components of a database. The orchestrator facilitates quick customization and release of database products, such as a HANA database with optional services, as requested by a user in the container cloud platform.

20 Claims, 4 Drawing Sheets

(56) References Cited

U.S. PATENT DOCUMENTS

| | | |
|---|---|---|
| 2011/0099147 A1 | 4/2011 | McAllister |
| 2011/0314466 A1* | 12/2011 | Berg ................... G06F 9/5072 |
| | | 718/1 |
| 2012/0089909 A1 | 4/2012 | Block et al. |
| 2013/0282657 A1* | 10/2013 | Besen ................ G06F 16/1844 |
| | | 707/625 |
| 2013/2382657 | 10/2013 | Bensen et al. |
| 2013/0332770 A1* | 12/2013 | Thiel ................... G06F 11/2094 |
| | | 714/15 |
| 2014/0181800 A1 | 6/2014 | Johansson |
| 2015/0046411 A1* | 2/2015 | Kazmaier ............... G06F 17/10 |
| | | 707/693 |
| 2015/0052254 A1* | 2/2015 | Zhao ................. G06F 9/45558 |
| | | 709/226 |
| 2015/0088823 A1* | 3/2015 | Chen .................... G06F 16/273 |
| | | 707/626 |
| 2015/0154042 A1* | 6/2015 | Katayama ........... G06F 9/45533 |
| | | 718/1 |
| 2016/0239391 A1 | 8/2016 | Sagiyama et al. |
| 2017/0168866 A1 | 6/2017 | Kono |
| 2017/0366616 A1* | 12/2017 | Rodrigues Nascimento ............... H04W 4/44 |
| 2018/0143856 A1 | 5/2018 | Du et al. |
| 2018/0146067 A1 | 5/2018 | Du et al. |
| 2019/0286486 A1* | 9/2019 | Ma .......................... G06F 9/524 |

OTHER PUBLICATIONS

Non-Final Office Action dated Apr. 17, 2019, issued for U.S. Appl. No. 15/355,079, filed Nov. 18, 2016, 39 pages.

Non-Final Office Action dated Jun. 13, 2019, issued in U.S. Appl. No. 15/355,129, 14 pages.

Non-Final Office Action dated Sep. 6, 2019 issued in U.S. Appl. No. 15/355,079, filed Nov. 18, 2016, 51 pages.

SUSE, Automate your SAP HANA System Replication Failover, Jun. 18, 2016, suse.com (Year: 2016).

* cited by examiner

EMBEDDED DATABASE AS A MICROSERVICE FOR DISTRIBUTED CONTAINER CLOUD PLATFORM

CROSS REFERENCE TO RELATED APPLICATIONS

This application is a continuation of U.S. patent application Ser. No. 15/355,129 filed on Nov. 18, 2016, which cross-references U.S. patent application Ser. No. 15/355,079 (U.S. Patent Publication No. 2018/0143856) filed on Nov. 18, 2016, and U.S. patent application Ser. No. 15/355,078 (U.S. Patent Publication No. 2018/0146069) filed on Nov. 18, 2016, which are each herein incorporated by reference for all purposes.

TECHNICAL FIELD

The present disclosure relates generally to a framework for distributed container management to facilitate customized product quick release and other services which can be built on that. The present disclosure also relates to providing microservices for database with embedded container service.

BACKGROUND

Management of a data center has become an important consideration in information technology (IT) and facility management disciplines, along with effective build and release of applications for used by its clients. Virtual systems have been employed to facilitate building applications (Apps) for a data center. However, conventional virtual systems, such as VMware, are too heavy weighted. For example, it is difficult for conventional virtual systems to support large applications, such as enterprise resource planning (ERP) applications, customer relationship management (CRM) applications or database applications, such as HANA. Furthermore, existing data centers require a build and installation of an application, for example, on bare metal, each time an application is requested. This is time inefficient.

The present disclosure provides a distributed management framework for applications in a data center which is lightweight and efficient by using containers. In addition, the distributed management framework includes containers with an embedded database as a microservice.

SUMMARY

A technology to facilitate management of a cloud data center and build/deployment of applications in a cloud data center is described herein. In accordance with one aspect of the technology, a distributed container cloud platform is disclosed.

Disclosed is a technology which facilitates database based product services, such as HANA based products, on cloud platform, with consideration for high availability for these services. The services are divided into numerous micro services which could be provided by the present distributed container cloud platform.

In one embodiment, a computer-implemented method for quick release of customized products with embedded database as a microservice is disclosed. The method includes providing a data center having z number of hosts for hosting numerous App images of cloud Apps. An App image is packed backed to a container which starts when a requested App image is requested and forms a job of the data center. The data center includes a container cloud manager on a manager host of the data center, the container cloud manager manages resources of the data center. The data center also includes an orchestrator. The orchestrator includes a job scheduler for scheduling jobs in the data center. The orchestrator also includes an operator pool. The operator pool includes optional components which are services of a database. In response to a user request to customize as specified version of a database with selected optional services, the job scheduler delivers the specified version of the database from the data center and selected optional services from the operator pool to a target host selected by the container cloud manager. The target host customizes the specified version of the database with the selected optional services to generate a customized App image.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
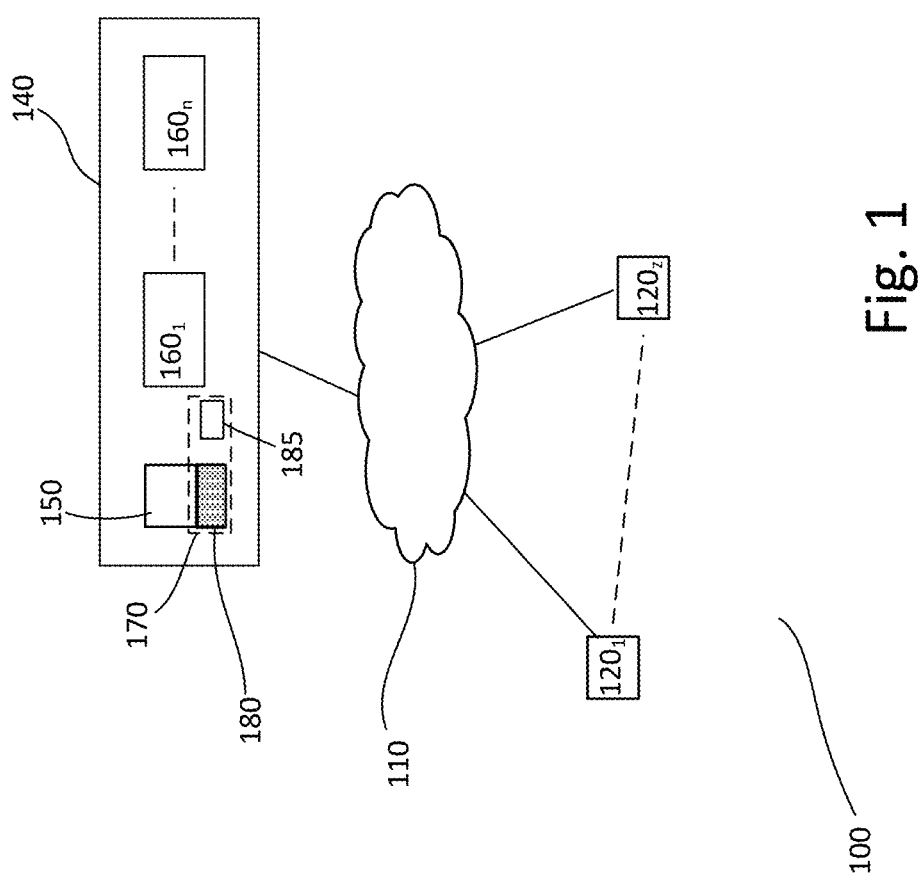
FIG. 1 shows an exemplary environment or architecture.

FIG. 1 shows a simplified diagram of an exemplary environment or architecture 100. Environment 100 may have a distributed architecture. In one implementation, the environment includes a data center 140. The data center provides various services to users. The data center and services form a cloud platform. The cloud platform, for example, may be Cloud Foundry. Other types of cloud platforms may also be useful.

The data center includes numerous interconnected servers. For example, the servers are connected through a communication network. The communication network may be an internet, an intranet, a local area network (LAN), a wide area network (WAN) or a combination thereof. Other types of connections may also be useful.

A plurality of clients, such as client $120_1$ to client $120_z$, may access the data center through a communication network 110. The value z represents the number of clients. The communication network may be an internet or a WiFi communication network. Other types of communication networks, such as an intranet or a combination of different types of communication networks may also be useful. Other techniques for communicating with the data center by the clients may also be useful. Access to the data center may require a user account and password. Other types of security measures may also be implemented.

A client may be a local or remote computing device with, for example, a local memory and a processor. The memory may include fixed and/or removable non-transitory computer-readable media, such as a magnetic computer disk, CD-ROM, or other suitable media. Various types of processing devices may serve as a client. For example, the client may be a PC, a tablet PC, a workstation, a network computer, a kiosk or a mobile computing device, such as a laptop, a tablet or a smart phone. Other types of processing devices may also be used. The client can receive, transmit, process and store any appropriate data associated with the architecture.

Clients may access the data center for various reasons. In one embodiment, clients may include developer clients and user clients. For example, developer clients develop applications (Apps) for the data center. In one embodiment, the developer clients may be developing Apps for a cloud platform or cloud foundry. As for user clients, they access the data center to utilize various available Apps. Other types of clients may also be included. For example, a front-end portion of an App, which is selected for installation, is loaded onto the client device. When invoked by the user, the back-end portion of the App runs in the data center, based on instructions by the user client. The results are presented to the user on the user device.

As for the data center, a server may be a computer which includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. A server, for example, is a host in the data center and does not include a display device. Other types and configurations of servers may also be useful.

As shown, the data center includes a container cloud manager module 150. The container cloud manager manages the resources of the data center, which includes a plurality of machines, such as machine $160_1$ to machine $160_n$. The value n represents the number of machines in a data center. It is understood that in a data center, n may be a very large number. For example, n may be about in the magnitude of thousands or even more. The number n may depend on, for example, the size of the data center. Other values of n may also be useful. The value of n may be dynamic. For example, n machines may be expanded or contracted based on requirements. The container cloud manager and machines, for example, are servers. The container cloud manager serves the role of a manager while machines serve the role of workers. Other configurations of container cloud manager and machines may also be useful.

The various components of the data center, such as the container cloud manager and machines, as discussed, are interconnected. The components may be distributed over different locations. For example, the components may be distributed across different buildings. The different may be proximately distributed, for example, in a city. A building may be provided with its own back-up power source. Providing back-up power source ensures undisturbed operation of the data center during a power outage. As for components of the data center, they may be distributed into different racks in a building. Power outage to one rack or defects of a rack will not affect the operation of all other racks.

In one embodiment, the container cloud manager includes a storage master and a master database. In one embodiment, the master database may be a SAP HANA database from SAP SE. For example, the master database may include a HANA XE Engine. Other types of databases may also be useful. In one embodiment, the container cloud manager includes multiple copies or replications. For example, the container cloud manager includes an original (master), second and third replications. Providing other numbers of copies may also be useful. In one embodiment, the cloud manager involves HANA System Replication (HANA SR). The cloud container manager and replications will be subsequently discussed in greater detail.

In one embodiment, the container cloud manager is embedded with application level container framework. For example, the container cloud manager and its replications work as a container framework. In one embodiment, the container framework is a Docker framework. For example, the container cloud manager and its replications work as a Docker framework. Other types of container frameworks may also be useful. For example, container frameworks, such as LXC or Rocket container frameworks may also be useful. Docker, for example, is embedded with the master database. This enables management of containers and cloud application (App) images of the data center. As will be subsequently discussed, Apps are stored as App images in the data center and the App images are run in the containers. The cloud container manager, in one embodiment, employs container service, such as Docker service, to manage containers and App images of the data center. Other types of container services may also be useful. In one embodiment, Docker is embedded with HANA SR master database, enabling management of containers and App images of the data center.

The framework, including cloud container manager, containers and App images serves as a cloud platform. For example, the cloud platform offers container service to customers. The container service in the cloud platform may be referred to as a container cloud. The container cloud may be a cloud foundry. As for the machines, they are hosts which serve as the resources for the data center. The cloud container manager manages the resources of the data center. For example, the machines are employed to build, package and deploy cloud Apps.

The container framework, such as Docker framework, may be a tool, an infrastructure or an architecture used to build, deploy and run Apps using containers. In one embodiment, the cloud container manager embedded with the container framework supports "one-build, run-everywhere" concept or function. In "one-build, run-everywhere", a customized App needs only to be built once. For example, a new App is built if it does not already exist in the data center. This is the one-build part of the "one-build, run-everywhere" function. Once the new App is built, its App image is stored in the data center. Subsequently, when a user searches the App, the user can find the App image and do whatever the user desires. In other words, the App can run everywhere. For example, this is the run-everywhere part of the "one-build, run-everywhere" function.

In one embodiment, the one-build function is supported by a build tool. In one embodiment, the build tool is a Jenkins build tool. Other types of build tools may also be useful. The build tool, for example, is a stand-alone tool. The build tool may run on any data center servers. A build is performed when a new App is released. For example, when a new App is delivered, it triggers the build tool to perform a new build using Docker. In one embodiment, the storage master searches the master database to see if the App already exists in the data center. If it does not, it triggers the build tool to initiate a build. For example, the container build is in the Jenkins build process. The container cloud manager maintains information of machines in the data center. For example, machines which support Docker are maintained in the master database. The container cloud manager selects a machine which supports Docker to build the App. The storage master and master database work together as the Docker framework. For example, the storage master and HANA SR of the container cloud manager work as the Docker framework. The build process, is described in, for example, U.S. patent application Ser. No. 15/355,078 (U.S. Patent Publication No. 2018/0146069) filed on Nov. 18, 2016, which is herein incorporated by references for all purposes.

The build includes generating an image of the App. A container is also built as part of the build process. The container, for example, is the runtime of the App image. The App image includes container configurations. For example, the container is configured with necessary dependencies and functions, and packed back to the App image. In one embodiment, the App image includes configurations for a Docker container. The framework may also support other types of containers. For example, App image may include configurations for other types of containers, such as LXC or Rocket. The container runs when the App is started. For example, the container starts based on the App image. The container isolates the App from the host and ensures that the App will run on any machines of the data center, regardless of any customized settings.

After the build is completed, information of the App image is registered with the master database of the container cloud manager. In one embodiment, information of the x copies of the App image is registered in the master database, such as HANA master database. In one embodiment, 3 copies of the App image are stored in the data center (e.g., x=3). Other values of x may also be useful. Excess copies greater than x are deleted from the data center. Each copy of the App image is stored in a different host of the data center. Such information may include App image information, including name, version, and host location where the images are stored. The App image is stored in the data center. Once the App exists in the data center, no additional build is performed. As such, only one build is needed for the App.

In one embodiment, as described, when a new App is released, a new container is created. For example, a new App release involves creating a new App image and a new container. The container is configured and packed back to the App image. Intermediate container or containers are deleted, leaving the App image. The container cloud manager encapsulates container service, such as Docker service. Other types of container services may also useful. For example, the Docker command interface is encapsulated as a library for further development. Encapsulating or embedding Docker service enables transparent operation by the user, such as using Linux command line directly. Also, Docker service supports some container changes or modifications. Such changes include, for example, specifying which host runs the App, SSH configuration and batch operation on Docker. Other types of changes or modifications may also be useful. Encapsulation of Docker services is achieved using library interfaces. The library interfaces can be used in various conditions. This enables further development. For example, a user, such as a developer, can use the library to build additional images or containers. Other types of users may also utilize the library interfaces. The user can employ the library interfaces as part of App development, App testing and App release as well as other purposes.

In one embodiment, "run-everywhere" is effected by containers. As discussed, a container is a runtime of the App image. When an App is started, the container starts. The container isolates the App from the host and ensures that the App will run on any machine of the data center, regardless of any customized settings. As such, the image can run on any machine in the data center. The App can run on other machines as well, such as those outside of the data center. The cloud container manager selects a host on which the container runs. For example, the cloud container determines the host based on memory, CPU and storage load balance. Other factors may also be used in host selection for running the container.

In one embodiment, the framework employs a distributed Docker infrastructure for the data center. The distributed Docker infrastructure, as discussed, includes multiple container cloud managers. For example, the distributed Docker infrastructure includes multiple servers serving as container cloud managers. Each of the container cloud managers is synchronized. For example, the container cloud managers contain identical information stored in the database after synchronization. In one embodiment, HANA SR performs the synchronization function. Other techniques for synchronizing the container managers may also be useful.

In one embodiment, the multiple copies of the data master manger should be strategically located to increase the probability that at least one copy of the container cloud manager is running. For example, the multiple copies of the container cloud manager are strategically located to minimize the likelihood that all the copies of the container cloud managers are down. The container cloud managers may be strategically located in different racks, different buildings and different parts of the city. For example, at least one container cloud manager is located in a different part of the city so as not to be affected by local power outages, or local or regional disasters. The locations may be selected to avoid all multiple copies to be simultaneously down. The information of the container cloud manager and its copies is configured when the environment is created.

The framework, as discussed, includes y container cloud managers. In one embodiment, the framework includes 3 container cloud managers (y=3). Providing other values of y may also be useful. For example, the numbers of container cloud managers may be greater or less than 3. The greater the number, the greater the assurance that the data center will be operable. Providing 3 container cloud managers have been found to provide a high level of assurance of maintaining data center operable. This is because it is very unlikely of a case where two container cloud managers are simultaneously unavailable. And even so, there is the third copy available.

In one embodiment, the first container cloud manager may be referred to as the master container cloud manager, the second container cloud manager is a second replication container cloud manager, and the third container cloud manager is a third replication container cloud manager. The master is configured to manage the data center. If the master is down, the second replication takes over managing the data center. For example, the second replication becomes the new master and the old master becomes the new second replication. While the new master is managing the data center, the third replication restores the new second replication to its current state. In the case that both the master and second replication are down, the third replication restores the master to its current state prior to being down. Then the master manages the data center while the third replication restores the second replication. Other configurations of restoring container cloud managers may also be useful.

In one embodiment, to further enhance the distributed architecture of the data center, an App image includes multiple copies of the App image, as discussed. For example, each App image includes x multiple copies of the App image. The copies of the App images are strategically stored so that at least one copy is always available. For example, the copies of the App image are stored in different machines of hosts in the data center. Preferably, the different hosts are not on the same node. Providing copies in hosts on different nodes avoids the situation of unavailable copies of the App image from a single node fault. For example, the hosts may be on different racks, different rooms, or different buildings. Other configurations of storing the copies may also be useful. The information of the Apps and their copies is maintained in the master database. For example, the information may be maintained in an App table in the master database, such as HANA master database. The App table contains all Apps in the data center.

In one embodiment, the framework includes 3 copies of an App image (x=3). Providing other values of x may also be useful. For example, the number of x copies may be greater or less than 3. The greater the number, the greater the assurance that an App image is available. However, this is at the cost of increased servers and machines. Providing 3 copies results in a high level of assurance of at least one of the App image copies is available. This is because it is very unlikely of a case where 3 copies are simultaneously unavailable. Excess copies are removed from the data center. Furthermore, it is understood that the number of cloud container masters y and the number of App image copies x can be different (e.g., x y).

As already discussed, the data center includes App images which can be requested by users. When an App image is requested, the container starts. In a data center, numerous App images may be requested. Numerous containers may be started for running as various job requests are received from user requests, such as developers or customers. Requested App images may be placed on a to-do job list for job submission. For example, a job may be pending as the container of requested App image is prepared. A job may be running when the full container environment is prepared and the requested App is running. In addition, a build of an App is also a job. For example, a build of an App may be a build job. For example, during a build, a container may be configured and packed back to the App image. Intermediate containers created during the build are removed.

In one embodiment, the container cloud master includes an orchestrator 170. The orchestrator, as shown, includes a flexible job scheduler 180 and an operator pool 185. A flexible job scheduler is described in U.S. patent application Ser. No. 15/355,079 (U.S. Patent Publication No. 2018/0143856) filed on Nov. 18, 2016, which is already herein incorporated for all purposes. The orchestrator facilitates embedding container service with a database, such as HANA, to provide database based microservices.

The flexible job scheduler and container cloud master form a flexible job management platform for managing jobs of the data center. In one embodiment, flexible job management platform is based on embedded HANA container service, such as Docker service. The flexible job management framework can isolate various types of jobs as well as mix various jobs for efficient usage of hosts or resources in the data center, including build jobs.

The container framework, such as Docker framework, which includes chronos or borg, is well designed for container based job management. For example, the job scheduler can integrate the container framework to efficiently manage the container cloud. The container based job management supports fault tolerance, job pre-emption or other job management functions. In one embodiment, a container cloud manager includes a flexible job scheduler 180. The flexible job scheduler leverages the data center's resources, including networking, memory, CPU usage for hosts load balance by utilizing hybrid job scheduling.

In addition, the flexible job scheduler enables monitoring and analysis of jobs utilizing container service, such as Docker service. Since the container isolates the internal status of the job from the host status, the scheduler, which is on a remote host from that running the job, needs to establish a SSH tunnel from the host of the container cloud manager in order to receive status update of the job. However, by utilizing Docker container command from the library of commands, the scheduler, which is on a remote host from that running the job, can access the host to obtain the job status. As such, the job management framework provides efficient utilization of data center resources.

As discussed, the job scheduler performs job management functions. As discussed, jobs run in containers and numerous jobs can be actively run at one time in the data center. In addition, there may be different types of jobs having different priorities. The job scheduler manages the requested jobs on the container cloud. The job management functions include scheduling, monitoring, and pre-emption of jobs. For example, the job scheduler schedules jobs as requested. The schedule is made based on priority and types of jobs. As for monitoring, the job scheduler monitors job status, such as pending, started, running, finished, failed, killed or lost. In addition, the job scheduler monitors resources of the data center, such as resource usage status, such as memory usage, disk usage and CPU usage of all the hosts of the data center. The job scheduler may perform job pre-emption by evicting or shifting lower priority jobs and replacing with higher priority jobs. In other words, job pre-emption relates to reorganizing the job schedule based on priority when new and higher priority jobs are requested.

The job scheduler may perform other job management functions. Other job management functions include, rescheduling or re-running jobs when incurs a failure or is intentionally killed, managing clusters of hosts which are designated for specific jobs, as well as managing jobs which run on multiple hosts. For example, some hosts may be clustered into a pool for a specific or exclusive type of job. The data center may include one or more clusters, each for a specific type of job. For a job which runs on multiple hosts, the job scheduler organizes and schedules the job on a group of hosts.

As discussed, the data center receives various types or categories of job requests. The categories of job requests include batch jobs, test jobs, immediate jobs and online jobs. Batch jobs refer to large jobs which are not required within a short time. For example, batch jobs may include analysis of enterprise sales data. Test jobs relate to testing various types of tests, such as unit testing, functional testing, and performance testing by developer users. Test jobs are generally needed in foreseeable future. Online jobs include interactive operations. Such jobs are required to be performed almost instantaneously. As for immediate jobs, they are required to be performed within a very short time. Such jobs may include a fast function check or a component function verification. For example, such jobs should be performed within tens of seconds.

Table 1 shows various categories of jobs along with priority and completion time frame.

TABLE 1

| Job Category | Completion Time | Priority |
| --- | --- | --- |
| Online | Instantaneous - within 1 second | Highest |
| Immediate | Within tens of seconds | High |
| Test | Within several minutes to hours | Medium |
| Batch | Within days | Low |

Providing other categories as well as completion time may also be useful.

As for the operator pool, it contains optional components of the database for various support services. For example, the operator pool contains optional components of HANA database as services. In the case of HANA database, such components may include, for example, geographical information system (GIS), predictive analysis library (PAL), application function library (AFL), dynamic tiering (DT), HAH system replication (HANA SR), text mining, R language integration, HANA cockpit, HANA python support, HANA test pack support and HANA mock test support. Providing other components may also be useful. For example, HANA may include many more optional components. In addition, non-HANA database components may also be useful for other types of databases.

In one embodiment, the data center maintains all base core images of a database. In on embodiment, the data center maintains all base core images of HANA database. Maintaining core images of other databases may also be useful. A user may select the desired version of the database and select microservices for customization. For example, a user may select the operators from the operator pool for customizing the database. In one embodiment, a user may customize a selected version of the HANA database with desired microservices selected from the operator pool.

In one embodiment, the job scheduler selects a host. The host selection, for example, may be based on load balance, such as memory, storage and CPU usage and capacity. In some cases, a user may select the host. For example, a user may specifically request a specific host. The selected version of the database core image and selected optional components are delivered to the selected host or hosts by the job scheduler. The user performs the desired operations at the selected host or hosts. For example, installation of the core image and configuration. In some cases, it may include a new build if the version of the App image does not exist. The final customized image is delivered to the user while intermediate images and containers are deleted or removed. In some cases, if the App image of the database is frequently used, it may be stored in the data center. For example, 3 copies are stored in the data center with TTL. The container cloud manager may select the hosts based on load balance, such as storage capacity. The image may be removed after non-use or after TTL.

Figure 2:
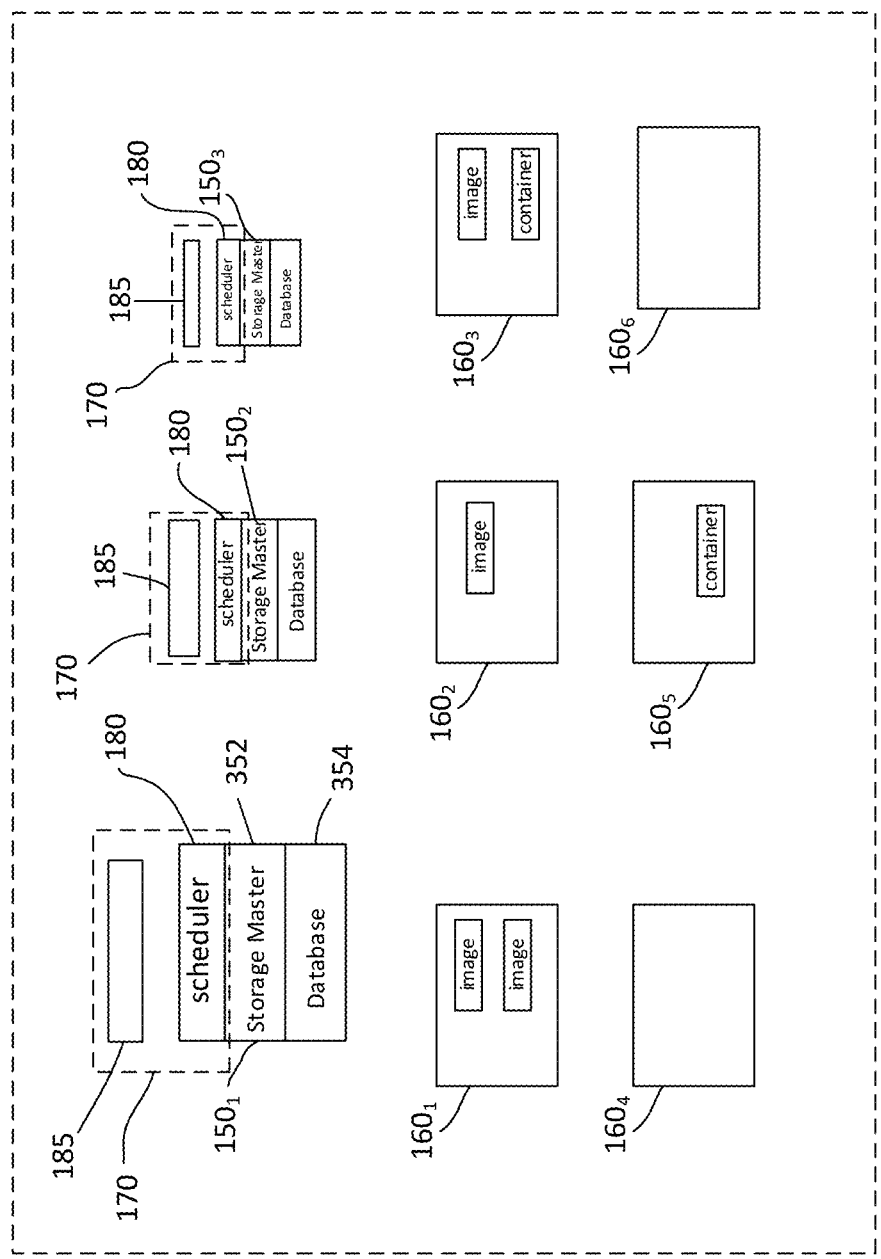
FIG. 2 shows a simplified architecture of a cloud data center.

FIG. 2 shows a simplified distributed App image and container management architecture 200 of a data center. The distributed management architecture includes y multiple container cloud managers, such as container cloud managers $150_{1-y}$. In one embodiment, y=3. For example, the distributed management architecture includes container cloud managers $150_1$, $150_2$ and $150_3$. Providing other number of container cloud managers may also be useful. In one embodiment, the first container cloud manager $150_1$ may be referred to as the master while the second and third container cloud managers may be referred to as the second and third replications. A discussed, a container cloud manager includes a storage master 352 and a master database 354. In one embodiment, a container cloud master also includes an orchestrator. The orchestrator 170 includes a job scheduler 180 and an operator pool 185. For example, container cloud master includes an orchestrator.

The storage master may be bundled with the master database. In one embodiment, the storage mater is bundled with HANA SR. For example, the storage master and HANA work as the container cloud manager to manage containers, such as Docker and/or other types of containers. This enables high availability due to the master and first and second replications. The master and the second replication are connected using a synchronization mode connection. For example, all information from the master is updated and maintained in master database of the second replication. The second replication and the third replication are connected using an asynchronous mode of connection. For example, information from the second replication may not be immediately updated in the master database of the third replication.

As also shown, the data center includes n plurality of hosts 160. Illustratively, only six hosts $160_1$ to $160_6$ are shown for simplicity. However, it is understood that the data center includes a large number of hosts. Also, as already discussed, the hosts may be distributed and need not be located in the same location. In addition, the hosts may be grouped into clusters. For example, a cluster is a pool of hosts for exclusive usage. In other cases, all the hosts of the data center may be a single cluster. In other words, a data center is made of one or more pool of hosts, a pool of hosts can be one or more hosts for exclusive usage. Other configurations of clusters may also be useful. For example, some pools of hosts are exclusively used during the day while others may be available at night.

The container cloud manager manages the resources of the data center. In one embodiment, the first or master container cloud manger may be the primary container cloud manager. For example, the master container cloud manager is used. In the event the master container cloud manager is down, responsibility of data center management transfers to the second storage manager. For example, the second container cloud manager serves as a backup for the master container cloud manager. The second replication effective becomes the new master while the old master becomes the new second replication. This enables the restoration of the old master container cloud manager without interruption operation.

In the event that both the first and second container cloud managers are down, the third container cloud manager serves as a disaster recovery system. For example, disaster recovery is performed to bring the first and second data managers back on-line. In one embodiment, data from the third container cloud manager is used to restore the first or second container cloud manager to its previous state. Once the first container cloud manager is back on-line, the other cloud manager may be restored. The first data center manager takes over the control of the data center once it is on-line and the second container cloud manager serves as the backup. Other configurations of providing backup in the case of one of the container cloud managers is down may also be useful.

In one embodiment, the storage master can access all hosts of the data center. The storage master accesses the hosts by, for example, using a user and password which is maintained in the master database. When a new build requests is initiated, the storage master requests host resource utilization information and selects a host which can support and perform the build. For example, the master database includes a list of hosts which support Docker build. The storage master, from the list, selects the host with the most resources available. For example, the host with the biggest memory, biggest disk size and most number of CPUs is selected. The build generates, in one embodiment, 3 copies of an App image. Generating other number of copies of an App image may also be useful. As already discussed, an App image includes a container packed backed to it.

In one embodiment, the distributed architecture of the data center includes storing copies of the App image strategically in different hosts to increase the probability that at least one copy is available for use by clients. In one embodiment, the container cloud manager automatically selects hosts for storing the copies of the App image. The host selection may be based on disk resource load balance. In addition, the host selection may take into account of selecting hosts on different nodes of the data center to avoid unavailability of all or multiple copies from a single node fault. For example, the hosts may be on different racks, different rooms, or different buildings. Other configurations of storing the copies may also be useful. For example, the developer user may select the hosts which the copies of the App image are stored.

As shown, copies of App images are distributed on different hosts of the data center. As for copies of different App images, they may occupy the same host. The information of all copies of all App images of the data center is maintained in the master database. For example, the information may be maintained in an App table in the master database.

As discussed, when an App image is requested, the container starts. For example, the container, which is the runtime of the App image, starts. The container's information is registered on the container cloud manager. For example, the container's information is registered on the master database. The host in which the container starts is selected by the storage master. For example, the storage master selects the host based on CPU, memory and disk load balance. After use, the container will be deleted. The relevant registered information of the container in the master database will also be deleted.

In one embodiment, the number of data center masters and the number of App copies in the data center is 3. Providing other numbers of data center masters and copies of Apps in the data center may also be useful. For example, the number of data center masters and App copies may be greater or less than 3. The greater the number, the greater the assurance that the data center will be operable and Apps are available. However, this is at the cost of increased servers and machines. Providing 3 data center masters and 3. App copies provide a high level of assurance of maintain data center operable. This is because it is very unlikely of a case where two data center masters of App copies are simultaneously unavailable. And even so, there is the third copy available. Furthermore, it is understood that the number of data center masters and App copies can be different.

In one embodiment, excess copies of App images and containers are removed from the data center. In addition, the App images and containers may be set with time to live (TTL). Removing excess copies and the use of TTL serves to prevent storage growth from being out of control.

In one embodiment, a container cloud manager has a flexible job scheduler. For example, the master, second and third replications each includes a flexible job scheduler. The flexible job scheduler, for example, is based on embedded HANA container service, such as Docker service. The flexible job management framework can isolate various types of jobs as well as mix various jobs for efficient usage of hosts or resources in the data center.

Figure 3:
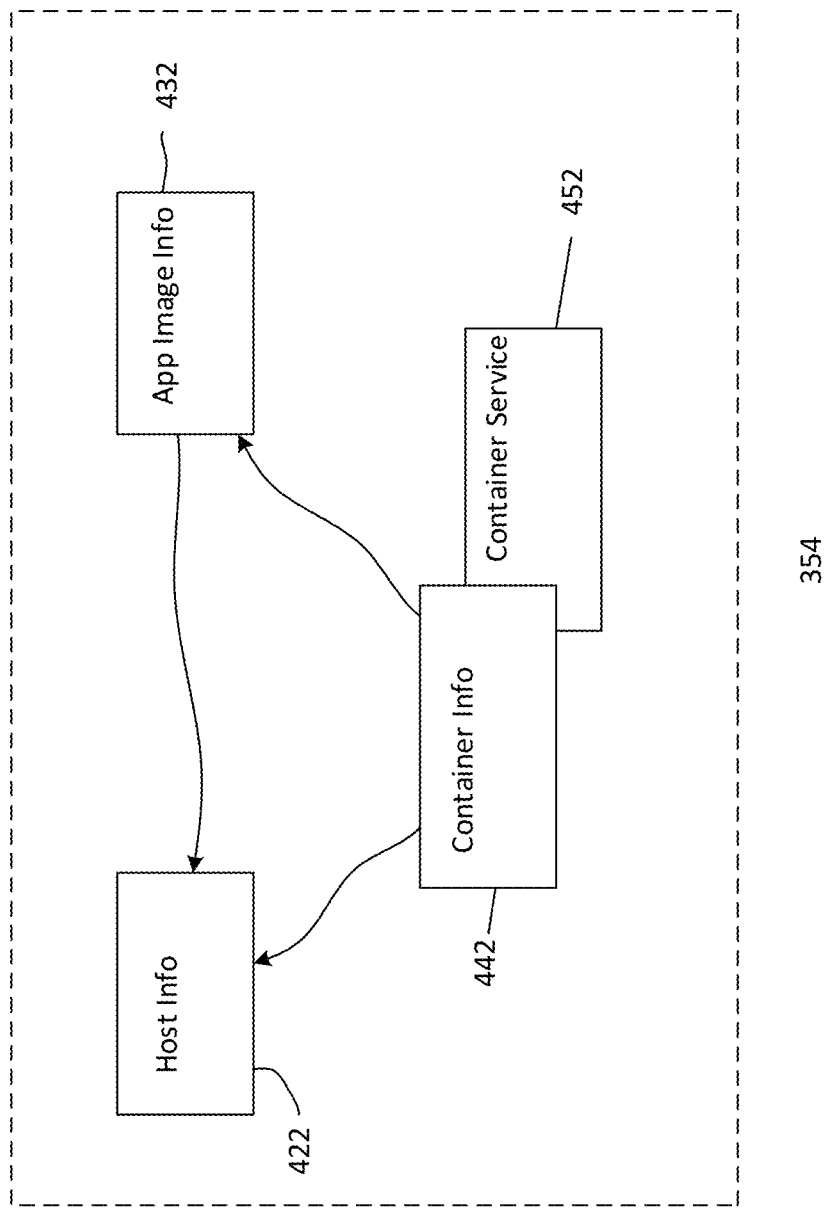
FIG. 3 shows an embodiment of a master database storage.

FIG. 3 shows an embodiment of data center information 354 which is maintained by the container cloud manager. The information, in one embodiment, is stored in the master database 354 of the container cloud manager. For example, the information may be stored as table or tables. In one embodiment, the master database maintains host information 422, App image information 432, and container information 442. The different information may be stored in separate data tables. In addition, the information is contained in different copies of container cloud masters. The information is synchronized with different container cloud masters. Other configurations of storing the information may also be useful.

Host information, for example, includes information as provided in Table 2 below:

TABLE 2

| Field Name | Description |
| --- | --- |
| hostname | Name of the host machine |
| user | User name of the user account for container cloud manager to access the host machine |
| password | Password of the user account for the container cloud manager to access the host machine |
| IP | IP address of the host machine |
| CPU | CPU power of the host machine |
| memory | RAM capacity of the host machine |
| Disk | Internal storage capacity of the host machine |

Providing other types of host information may also be useful.

App image information, for example, includes information as provided in Table 3 below:

TABLE 3

| Field Name | Description |
| --- | --- |
| imageID | ID of the App image |
| buildversion | Version of the App image |
| copy1location | Host location of the first copy in the data center |
| copy2location | Host location of the second copy in the data center |
| copy3location | Host location of the third copy in the data center |
| createtime | Time stamp when the App image was generated |
| TTL | Time to live for the App image |
| remarks | Comments |

Providing other types of App image information may also be useful.

Container information, for example, includes information as provided in Table 4 below:

TABLE 4

| Field Name | Description |
| --- | --- |
| location | Host location of the container |
| imageID | ID of the App image which the container is packed to |
| createtime | Time stamp when the container was generated |
| modified | Whether the container has a modified version and points to the modified version |
| TTL | Time to live of the container |
| remarks | Comments |

Providing other types of container information may also be useful.

In one embodiment, container service information 452 is associated with the container. For example, the container service is a Docker command abstracted interface, which is a supported Docker service. Container service information, for example, includes services of the container. Such services may include SSH free pass, batch job as well as other types of container services. Other types of information of the data center may also be maintained in the master database.

Figure 4:
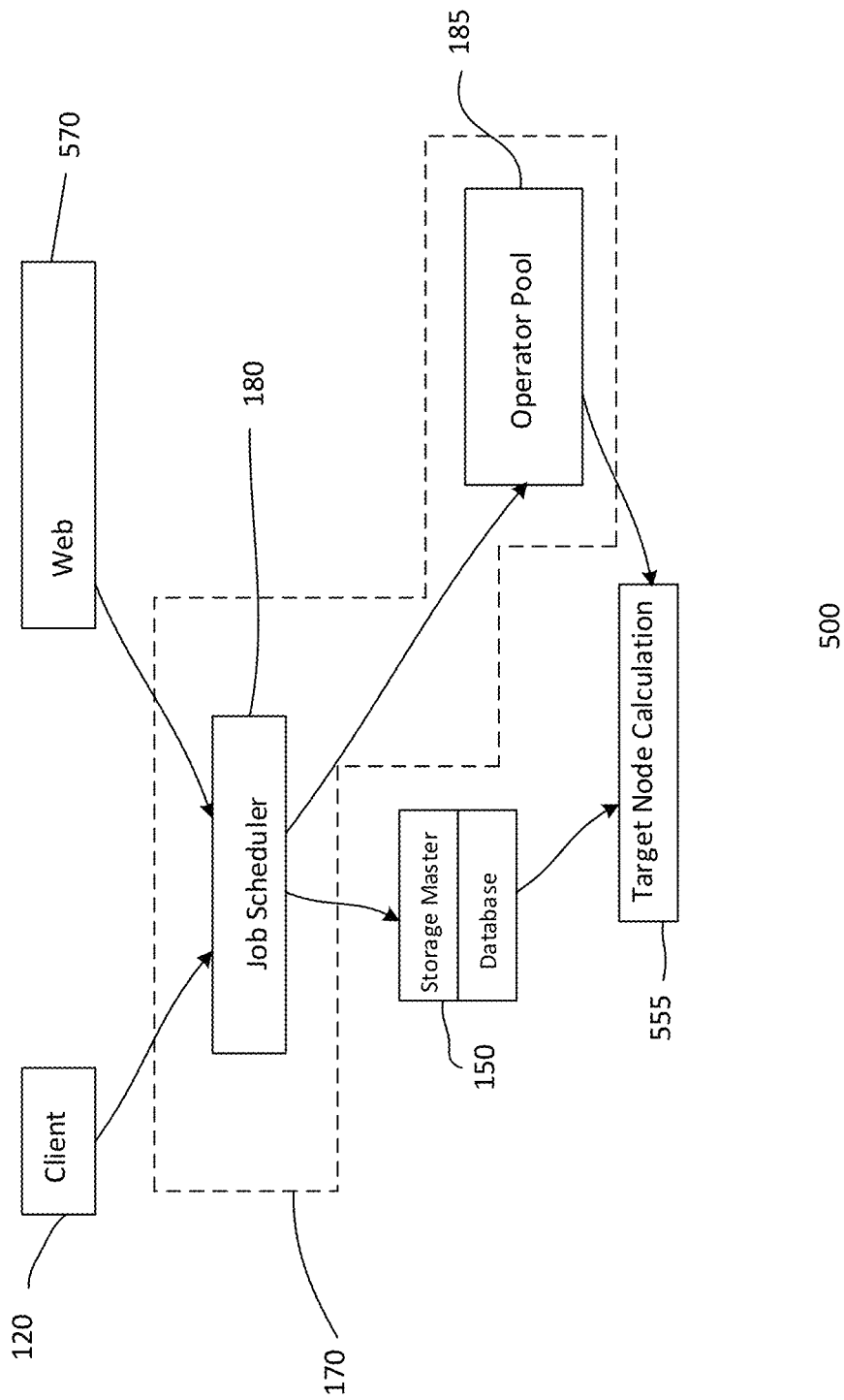
FIG. 4 shows an embodiment of data center master with Docker micro service.

FIG. 4 illustrates an example of encapsulating of container service 400, such as Docker service, to users. A client 120 may access the data center through the orchestrator 180. The client may access the data center through client mode or web access mode. For example, in the client mode, the client accesses the data center directly using, for example, a client application, such as an open database connectivity (ODBC) or Java database connectivity (JDBC) interface. On the other hand, in the web access mode, the client accesses the data center through the Web 570. For example, the client may access the data center through a web browser or interface, such as Chrome, Internet Explorer, Safari or Firefox. Alternatively, the web access may use HANA XS Engine interface.

In one embodiment, a user selects what the user wants using a service request. For example, a user submits a service request for an App image or selects a version of the database. In one embodiment, a service request includes a specific version of the database, such as a specific version of HANA database and desired microservices. Other types of service requests may also be received. The request is submitted to the job scheduler. Typically, numerous requests are submitted to the job scheduler. In one embodiment, the framework uses a message to serialize the incoming requests. In one embodiment, the framework uses rabbitMQ to support a robust, disaster tolerant work flow of "producer-consumer" model. All job requests are sent to the message queue as a producer work list. The job scheduler reads the message queue and consumes all the service requests, which is a consumer work list.

In one embodiment, the selected version of the database is deployed from the data center. The information of the selected version, as discussed, is maintained in the master database. The storage master selects a host (target host) to work on the request. The storage master selects the host based on load balance. The job scheduler delivers the selected version of the database and services requested from the operator pool to the target host. The target host may be an intermediate host. In other cases, the target host may be selected by the user. The target host should have sufficient resources for servicing the request. For example, the target host should have sufficient resources to perform calculations, such as build, combine, install, configure, as well as other operations, such as grouping the script calculation, to generate the customized image. In the case that the desired version of the App image does not exist, a build is triggered.

In one embodiment, all the additional services are preserved in the operator pool. For example, the operator pool may include scripts or a product installation toolkits. The specified scripts or toolkits are delivered to the target node with the base App image for reconfiguration or re-build to form a customized App image. In the case the specified base App image does not exists, a build is first performed followed by delivering the App image and specified scripts to the target node. An image upgrade is performed at the target host. For example, the services are linearized to a series of operations on the base core image. This generates a series of intermediate images. After the customized image is generated, all intermediate results, operator files and base core image are removed. The new image may be delivered to the user. In some cases, for example, if the image is frequently requested, it may be stored in the data center. For example, 3 copies of the image are stored in the data center.

As discussed, the present framework utilizes lightweight container technology to efficiently build and deploy applications as App images. An App image includes a container packed back to it. As an example, a build of a HANA database application using the present framework will take about 5-6 minutes. For example, the HANA App image with container packed back to it will take about 5-6 minutes. The size of the HANA App image is about 12-14 gigabytes. Given that a data center typically has a data transfer rate of about 1000 megabytes per second (MB/s), the transfer of the HANA App image to its target host will take about 13 seconds. Starting the container from the HANA App image takes about 5 seconds. This results in a total of 18 seconds for HANA App image to run after the build. For smaller Apps, starting a container from the App image takes only about 1 second. Clearly, the present framework results in significant time savings compared to conventional builds and installations on bare metal, which can take hours, especially for large Apps, such as HANA and other ERP Apps. Furthermore, bare metal requires a build each time it is used. On the other hand, the present framework only requires one build.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:
1. A computer-implemented method comprising:
providing a data center comprising:
a plurality of hosts hosting a plurality of application images for one or more applications, respective application images being stored in a corresponding stored container that is instantiated when a requested application image is requested for a data center job;
a plurality of container cloud managers on respective manager hosts, wherein the plurality of container cloud managers manage resources of the data center and maintain respective instances of a master database, the master database instances comprising application image information, host information, and container information,
the application image information comprising, for respective applications of the one or more appli- cations, an application name and at least one host location where images of the respective application are stored, the host information comprising names of at least a portion of the plurality of hosts and computing resource capabilities of respective hosts, and the container information comprising, for respective containers of a plurality of containers, a host location of the container and an identifier of an application image which the respective container is packed to;

a replication manager, wherein the replication manager replicates database data from the master database instance of a master container cloud manager, corresponding to a first container cloud manager of the plurality of container cloud managers, to the master database instance of at least a first replication container cloud manager, corresponding to a second container cloud manager of the plurality of container cloud managers, the replicated database data comprising the application image information, the host information, and the container information; and a job scheduler, wherein the job scheduler and a container cloud manager of the plurality of container cloud managers form a job management platform of the data center; and replicating database data from the master database instance of the master container cloud manager to the master database instance of the replication container cloud manager, receiving a request to generate an application image of a first application of the one or more applications;

building the application image of the first application and storing the application image in a container;

storing a copy of the application image of the first application and its respective container on a first number of hosts of the plurality of hosts, wherein the first number of hosts are automatically selected by the container cloud manager of the plurality of container cloud managers based on resource load balance of the data center;

subsequent to the storing the copy of the application image on the first number of hosts of the plurality of hosts, receiving a request to initiate a first job on a selected copy of the application image on a host of the first number of hosts;

starting the container of the requested application image;

starting the application of the requested application image; and starting the requested first job on the application and on the host of the first number of hosts.

2. The method of claim 1, further comprising:
submitting a requested job to the job management platform, wherein when the requested job is accepted, the requested job becomes a pending job and wherein the running job runs in multiple containers.

3. The method of claim 1, wherein the multiple containers of the running job are located on different hosts of the data center.

4. The method of claim 3 wherein the running job on multiple containers located on different hosts of the data center is terminated and reconfigured to run on multiple containers on the same host of the data center.

5. The method of claim 1, wherein replicating database data from the master database instance of the master container cloud manager to the master database instance of the replication container cloud manager is carried out synchronously.

6. The method of claim 5, wherein the replication container cloud manager is a first replication container cloud manager in communication with a second replication container cloud manager, the second replication container cloud manager selected from the plurality of container cloud managers, the method further comprising:
asynchronously replicating database data from the master database instance of the first replication container cloud manager to the master database instance of the second replication container cloud manager.

7. The method of claim 1, wherein a maximum of three copies of the application image and the container are stored.

8. The method of claim 1, further comprising:
assigning a time to live value to at least a first copy of an application image of the plurality of application images and its respective container;
determining that the time to live value has been exceeded; and
deleting the first copy of the application image and its container.

9. The method of claim 1, further comprising:
receiving a request to initiate a first job on a selected at least a second copy of the application image on a host of the multiple hosts;
starting the container of the requested application image;
starting the application of the requested application image; and
starting the requested first job on the application and on the host of the multiple hosts.

10. One or more non-transitory computer-readable media having stored thereon program code,
the program code executable by a computing system providing a data center comprising:
a plurality of hosts hosting a plurality of application images, respective application images being stored in a corresponding stored container that is instantiated when a requested application image is requested for a data center job;
a plurality of container cloud managers on respective manager hosts, wherein the plurality of container cloud managers maintain respective instances of a master database, the master database instances comprising application image information, host information, and container information, wherein the container cloud managers manage resources of the data center;
a replication manager, wherein the replication manager replicates database data from the master database instance of a master container cloud manager, corresponding to a first container cloud manager of the plurality of container cloud managers, to the master database instance of at least a first replication container cloud manager, corresponding to a second container cloud manager of the plurality of container cloud managers, the replicated database data comprising the application image information, the host information, and the container information; and
a job scheduler, wherein the job scheduler and a container cloud manager of the plurality of container cloud managers form a job management platform of the data center;

the program code being executable to cause the computing system to perform operations comprising:
  replicating database data from the master database instance of the master container cloud manager to the master database instance of the replication container cloud manager;
  receiving a request to generate an application image of a first application;
  building the application image of the first application and storing the application image in a container;
  storing a copy of the application image and the container on a first number of hosts of the plurality of hosts, wherein the first number of hosts are automatically selected by the container cloud manager of the plurality of container cloud managers based on resource load balance of the data center;
  subsequent to the storing the copy of the application image on the first number of hosts of the plurality of hosts, receiving a request to initiate a first job on a selected copy of the application image on a host of the first number of hosts;
  starting the container of the requested application image;
  starting the application of the requested application image; and
  starting the requested first job on the application and on the host of the first number of hosts.

11. The one or more non-transitory computer-readable media of claim 10, wherein the program code is executable to cause the computing system to perform operations comprising:
  submitting a requested job to the job management platform, wherein when the requested job is accepted, the requested job becomes a pending job;
  monitoring the status of the pending job, wherein when the pending job is scheduled to run on a selected host, the pending job becomes a running job; and
  monitoring the status of the running job, wherein if the running job is completed to result in a completed job, the management platform completes managing the completed job.

12. The one or more non-transitory computer readable media of claim 11, wherein the program code is executable to cause the computing system to perform operations comprising:
  assigning a time to live value to at least a first copy of the application image and the container;
  determining that the time to live value has been exceeded; and
  deleting the first copy of the application image and the container.

13. The one or more non-transitory computer readable media of claim 10, wherein the replicating is carried out synchronously.

14. The one or more non-transitory computer readable media of claim 13, wherein the replication container cloud manager is a first replication container cloud manager in communication with a second replication container cloud manager, the second replication container cloud manager selected from the plurality of container cloud managers, wherein the program code is executable to cause the computing system to perform operations comprising:
  asynchronously replicating database data from the master database instance of the first replication container cloud manager to the master database instance of the second replication container cloud manager.

15. The one or more non-transitory computer-readable media of claim 10, wherein a maximum of three copies of the application image and the container are stored.

16. A system for managing a data center comprising:
  a plurality of hosts for hosting a plurality of application images for one or more applications, respective application images being stored in a corresponding stored container that is instantiated when a requested application image is requested for a data center job;
  a container cloud manager on a manager host of the data center, wherein the container cloud manager manages resources of the data center and comprises a database;
  a replication manager, wherein the replication manager replicates database data from the master database instance of a master container cloud manager, corresponding to a first container cloud manager of the plurality of container cloud managers, to the master database instance of at least a first replication container cloud manager, corresponding to a second container cloud manager of the plurality of container cloud managers, the replicated database data comprising the application image information, the host information, and the container information;
  a job scheduler, wherein the job scheduler and container cloud manager form a job management platform of the data center, wherein the job management platform manages jobs running in containers in the data center;
  at least one processor; and
  one or more memories in communication with the at least one processor and storing computer-executable instructions, that when executed by the at least one processor, cause the at least one processor to perform operations comprising:
    replicating database data from the master database instance of the master container cloud manager to the master database instance of the replication container cloud manager;
    receiving a request to generate an application image of a first application of the one or more applications;
    building the application image of the first application and storing the application image in a container;
    storing a copy of the application image and the container on a first number of hosts of the plurality of hosts, wherein the first number of hosts are automatically selected by the container cloud manager of the plurality of container cloud managers based on resource load balance of the data center;
    assigning a time to live value to at least a first copy of the application image and the container;
    subsequent to the storing the copy of the application image on the first number of hosts of the plurality of hosts, receiving a request to initiate a first job on a selected at least a second copy of the application image on a host of the first number of hosts;
    starting the container of the selected copy of the requested application image;
    starting the application of the selected copy of the requested application image;
    starting the requested first job on the application and on the host of the first number of hosts;
    determining that the time to live value has been exceeded; and
    deleting the first copy of the application image and the container.

17. The system of claim 16, wherein the plurality of container cloud managers manage resources of the data center and maintain respective instances of a master database, the master database instances comprising application image information, host information, and container information, the application image information comprising, for respective applications of the one or more applications, an application name and at least one host location where images of the respective application are stored, the host information comprising names of at least a portion of the plurality of hosts and computing resource capabilities of respective hosts, and the container information comprising, for respective containers of a plurality of containers, a host location of the container and an identifier of an application image which the respective container is packed to.

18. The system of claim 16, wherein the replicating is carried out synchronously.

19. The system of claim 18, wherein the replication container cloud manager is a first replication container cloud manager in communication with a second replication container cloud manager, the second replication container cloud manager selected from the plurality of container cloud managers, wherein the program code is executable to cause the computing system to perform operations comprising:

asynchronously replicating database data from the master database instance of the first replication container cloud manager to the master database instance of the second replication container cloud manager.

20. The system of claim 16, wherein a maximum of three copies of the application image and the container are stored.

\* \* \* \* \*